United States Patent Office 3,333,949
Patented Aug. 1, 1967

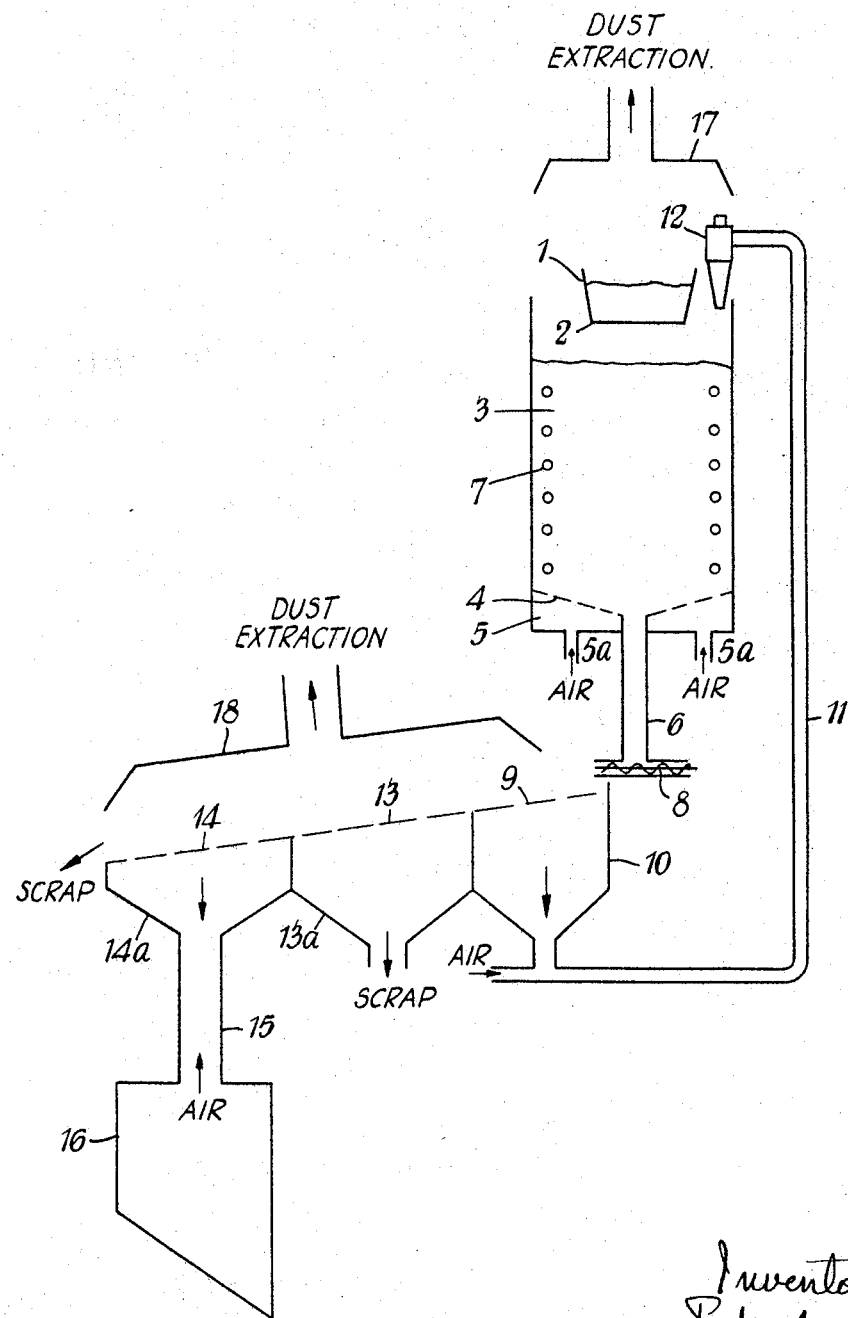

3,333,949
MANUFACTURE OF METAL PELLETS
Peter Ayers, High Wycombe, and Alan George Furness, Beaconsfield, England, assignors to The British Aluminium Company Limited, London, England, a company of Great Britain
Filed Apr. 10, 1964, Ser. No. 359,555
Claims priority, application Great Britain, Apr. 11, 1963, 14,665/63
4 Claims. (Cl. 75—.5)

This invention relates to improvements in the manufacture of metal pellets.

The invention is of particular, but not exclusive, application in the manufacture of aluminium pellets. Certain industrial processes require the use of high purity aluminium in the manufacture of a catalyst, the aluminium being in granular or pellet form and of a shape convenient for handling and processing. Granulation of the aluminium is commonly achieved either by allowing droplets of molten aluminium to fall on to a chilled flat surface to produce discs which are slightly domed on one side and substantially flat on the other, with a sharp edge periphery; or by quenching droplets of molten aluminium in water, preferably covered with a layer of oil to minimise reaction between the water and the hot metal during solidification. In the latter case the product is irregular in shape and the pellets frequently show inflation as a result of reaction between the metal and steam at the water/metal interface and the subsequent absorption of hydrogen. When the pellets cool, water tends to be sucked into the cavities thus formed and the product is only dried with difficulty. The granulated product resulting from either of the processes is not entirely satisfactory from the shape aspect as sharp edges and lack of uniformity cause much difficulty in handling, particularly where the pellets are to be blown through conduit to a processing location. The fact that the product from the water quenching process must also be degreased and/or dried before use is an added disadvantage.

It is an object of the present invention to provide an improved method and apparatus for manufacturing metal pellets which shall be commercially economic and which shall be capable of manufacturing the pellets without the formation of relatively sharp edges thereto, thereby improving the handling thereof.

According to one aspect of the present invention, a method of manufacturing metal pellets comprises dropping droplets of molten metal into a cooling bed of particulate material fluidised by a gaseous medium.

The particulate material is preferably substantially inert to the molten metal.

More particularly, the invention provides a method of manufacturing metal pellets which comprises dropping droplets of molten metal into a cooling bed of particulate material fluidised by a gaseous medium to an apparent viscosity selected in relation to the depth of the bed and the temperature of the bed to ensure that the droplets, on falling to the floor of the bed are solidified at least to an extent sufficient to retain their shape.

Advantageously, the solidified droplets or pellets are removed from the bed and passed over vibrating screens to separate pellets of a selected size or range of sizes from the remainder thereof.

The invention is of particular application to the manufacture of pellets of aluminium or aluminium base alloys in which case, the particulate material is alumina, or an alumina-silica catalyst.

According to another aspect of the present invention, apparatus for use in the manufacture of metal pellets comprises a cooling bed of fluidisable particulate material intended to have droplets of molten metal dropped thereinto, means for fluidising the bed, and means for extracting the substantially solidified pellets from the floor of the bed.

Preferably the floor of the bed is inclined downwardly towards an outlet through which the pellets are intended to be discharged under gravity.

Desirably, the outlet opens to the top of an inclined screen intended to be vibrated and fitted with a series of different sized mesh portions for the separation of pellets of a selected size or range of sizes from the remainder thereof.

Conveniently, the outlet opens to the top of that part of the screen fitted with a mesh portion the mesh of which is sufficiently small to prevent the passage therethrough of pellets but large enough to permit the passage of the particulate material therethrough.

Advantageously, means is provided for pneumatically conveying any particulate material passing through said part of the screen back to the bed through a cyclone.

One embodiment of the invention will now be described by way of example, reference being made to the accompanying drawing which is a diagrammatic representation of an apparatus according to the invention.

The apparatus comprises a crucible 1 having a substantially flat base 2 formed with a multiplicity of apertures (not shown) of approximately 3/64 in. The crucible is formed from a material resistant to attack by molten aluminium at 720° C. and is intended to be vibrated. The apertures in the base 2 are substantially evenly distributed so that there is not less than 3 ins. between the centres of adjacent holes. These apertures may be lined by frusto-conical ceramic inserts to reduce wear on the bores of the apertures. The crucible is disposed at a distance of about 6 ins. above the top of a fluidised bed 3 of particulate material consisting of an alumina-silica catalytic cracking catalyst having an average particle size of bout 67 microns. The bed 3 is about 5 feet deep and 4 feet in diameter, and has a floor 4 of rolled metal wire cloth which is substantially conical in shape and is inclined outwardly at an angle of about 20° to the horizontal to a centrally disposed inlet pipe 6 of approximately three inches internal diameter. The floor 4 is disposed above a plenum chamber 5 to which air is supplied under pressure through pipes 5a to pass through the floor 4 and fluidise the bed 3, the rate of flow of the air being arranged to be about 3 cu. ft./min./ft.$^2$ of cross-section of bed. Within the bed 3 is disposed a coil of pipe 7 intended to have cooling water passed therethrough to maintain the bed at a selected cooling temperature. At the base of the outlet pipe 6 is disposed a screw conveyor 8 having a diameter of about 4 ins. which discharges over the first part of a three-part downwardly inclined vibrating screen. This first part is composed of a mesh portion 9 of 25 mesh disposed above a collecting hopper 10 communicating with a pipe 11 leading to a cyclone 12 disposed above the bed 3. The second part of the screen is indicated at 13 and is composed of a mesh portion having a 3/4" mesh and disposed above a hopper 13a. The third part of the screen is indicated at 14 and is composed of mesh portion of 1/2" mesh disposed above a further hopper 14a which communicates by way of a pipe 15 with a storage hopper 16, means being provided to pump air up the pipe 15 at a velocity of about 50 ft./sec. Above the crucible 1 and the bed 3 is disposed a dust extracting hood 17 and above the vibrating screen is disposed a further dust extracting hood 18.

The operation of the apparatus is as follows:

The crucible 1 is supplied with molten aluminium at about 720° C. and the crucible is vibrated to ensure a steady flow of drops of molten metal through each of the apertures in the base 2. These drops of metal fall into the fluidised bed 3 and enter the bed 3 substantially in the form of a sphere and are cooled by the fluidised bed 3 each drop cooling substantially during its fall through the bed so that solidification has taken place by the time it reaches the floor 4 at least to an extent sufficient to retain its shape. The newly formed pellets slide down the sloping floor 4 and out through the outlet pipe 6, and flow of pellets together with particulate material from the bed being controlled by the screw conveyor 8. The pellets and particulate material fall on to the mesh portion 9 which is so dimensioned that only the particulate material passes through the mesh portion 9 and is collected in the hopper 10 from which it is pneumatically conveyed along the pipe 11 through the cyclone 12 back to the bed 3. The pellets slide down the inclined vibrating screen to the next adjacent mseh portion 13 which allows undersized pellets to fall through the hopper 13a and pass to scrap. The remainder of the pellets pass down to the mesh portion 14 through which the desired product passes to the hopper 14a and through the pipe 15 to the storage hopper 16. The air pumped up the pipe 15 removes the last traces of particulate material from the pellets. Any pellets which do not pass through the mesh portion 14 slide down the screen and are collected for scrap.

Analysis of pellets of high purity aluminium produced by the method and apparatus described above using a bed of alumina/silica shows an increase of only 0.016% in the alumina content, both figures being based on 100% of metal, thus indicating extremely slight contamination by pick-up in the bed. The product is characterised by its uniformity, smoothness and brightness and its shape is particularly suitable for handling.

It will be appreciated that the method and apparatus of the present invention have application to the manufacture of pellets not only of aluminium but also of other metals.

What we claim is:
1. A method of manufacturing metal pellets which comprises dropping droplets of molten metal into a cooling bed of particulate material fluidised by a gaseous medium.
2. A method of manufacturing metal pellets which comprises dropping droplets of molten metal in a cooling bed of particulate material fluidised by a gaseous medium to an apparent viscosity selected in relation to the depth of the bed and the temperature of the bed to ensure that the droplets, on falling to the floor of the bed are solidified, at least to an extent sufficient to retain their shape.
3. A method according to claim 2 including the step of removing the solidified droplets from the bed and passing said droplets over at least one vibrating screen to separate droplets of a selected size from the remainder.
4. A method of manufacturing metal pellets which comprises the steps of fluidising a bed of particulate material with a gaseous medium, allowing droplets of molten metal to fall into the fluidised bed controlling the flow of the gaseous medium at a rate selected in relation to the depth and temperature of the bed to produce an apparent bed viscosity to ensure that the droplets are solidified at least to an extent sufficient to retain their shape on falling to the floor of the bed and removing the at least partially solidified droplets from the bed.

References Cited
UNITED STATES PATENTS 2,037,672    4/1936    Zeiss.
3,043,652    7/1962    Schytil _____ 75—9

HYLAND BIZOT, *Primary Examiner.*

D. L. RECK, W. W. STALLARD, *Assistant Examiners.*